United States Patent
Choi et al.

(10) Patent No.: US 7,649,963 B2
(45) Date of Patent: Jan. 19, 2010

(54) APPARATUS FOR ESTIMATING AND COMPENSATING CARRIER FREQUENCY OFFSET AND DATA RECEIVING METHOD IN RECEIVER OF WIRELESS COMMUNICATION SYSTEM

(75) Inventors: Joonsang Choi, Seoul (KR); Jungnam Yun, Seoul (KR); Jaehyeong Kim, Seoul (KR)

(73) Assignee: Posdata Co., Ltd., Seongnam-si, Kyeonggi-do (KR)

( * ) Notice: Subject to any disclaimer, the term of this patent is extended or adjusted under 35 U.S.C. 154(b) by 636 days.

(21) Appl. No.: 11/394,269

(22) Filed: Mar. 29, 2006

(65) Prior Publication Data
US 2007/0230591 A1    Oct. 4, 2007

(51) Int. Cl.
*H04L 27/06* (2006.01)

(52) U.S. Cl. .................................................... 375/340

(58) Field of Classification Search ................. 375/340, 375/260, 130, 150, 343; 370/242
See application file for complete search history.

(56) References Cited

U.S. PATENT DOCUMENTS

2006/0215778 A1*   9/2006  Murthy et al. .............. 375/260
2008/0304587 A1*  12/2008  Setoh et al. ................. 375/260

* cited by examiner

*Primary Examiner*—Khai Tran
(74) *Attorney, Agent, or Firm*—Fenwick & West LLP

(57) ABSTRACT

The present invention relates to an apparatus for estimating and compensating a carrier frequency offset, and a data receiving method in a receiver of a wireless communication system. The apparatus correlates a received signal with a signal delayed by a predetermined period of the received signal in a correlation window, wherein the correlation window is set based on a Cycle Prefix (CP) and a preamble repetition length from a predetermined position, converts the correlated value into a phase value, compensates a phase of the converted result according to preamble segment numbers, and estimates an initial carrier frequency offset value.

12 Claims, 8 Drawing Sheets

APPARATUS FOR ESTIMATING AND COMPENSATING CARRIER FREQUENCY OFFSET AND DATA RECEIVING METHOD IN RECEIVER OF WIRELESS COMMUNICATION SYSTEM

BACKGROUND OF THE INVENTION

1. Field of the Invention

The present invention relates to a wireless communication system, and more particularly, to an apparatus and a method for estimating and compensating an initial carrier frequency offset in a receiver of a wireless communication system according to an orthogonal frequency division multiple access (OFDMA).

2. Description of Related Art

Much research in various fields to realize the fourth generation (4G) mobile communications is in progress. In 4G mobile communication according to IEEE 802.16d/e, WiBro, WiMAX, etc., a wireless LAN network, a digital audio and video broadcasting network, etc., as well as a satellite communication network is integrated into single network to systematically work together. Accordingly, service for a user may be smooth and optimal in the 4G mobile communication network.

A mobile device (Portable Subscriber Station) may communicate with a base station (Radio Access Station) by processing a preamble signal received from the base station system to synchronize a system. A downlink (DL) preamble signal is transmitted from the base station system at the first symbol location every frame. Accordingly, the mobile device synchronizes a system based on the preamble signal, searches a cell, and demodulates data following the preamble signal transmitted from the base station system.

FIG. 1 is a block diagram illustrating a conventional wireless communication system 100. In the conventional wireless communication system 100, transmission data is modulated according to a predetermined method in a modulator 110 of a transmitter. The modulated data is loaded onto a carrier signal and transmitted through a channel via a transmitter (Tx) circuit 120. The signal which is transmitted through a channel is received in a receiver (Rx) circuit 150 of a receiver and is affected by additive white Gaussian noise (AWGN). The Rx circuit 150 converts the received signal into a baseband signal, and a demodulator 160 demodulates the baseband signal to acquire the transmission data.

In an OFDMA system, for instance, the demodulator 160 synchronizes the system according to the preamble signal from the first symbol location of the downlink (DL), searches for a cell and demodulates data following the preamble signal. A method for estimating an initial carrier frequency offset in a frequency domain may be utilized to synchronize a mobile device system and receive data transmitted from a base station system. However, the frequency offset estimation method in the frequency domain, which may estimate a fine frequency offset by using pilot symbols, can be used after an initial synchronization process due to unknown Fast Fourier Transform (FFT) timing in the frequency domain.

Accordingly, the initial carrier frequency offset estimation shall be performed in the time domain. That is, if there is the same frequency offset in repeated samples in the time domain, a corresponding offset can be estimated by using repetitive pattern characteristics of training symbols of the OFDMA preamble.

FIG. 2 is a block diagram illustrating a conventional carrier frequency offset estimator 200. In FIG. 2, when a received signal r(t) is sampled and stored in a register 210, repetitive signal samples in every Nth, for example, r(n) and r(n+N), r(n+1) and r(n+N+1), . . . , r(n+d) and r(n+N+d), etc., are processed in complex conjugators 211, 213, . . . , 215 and multipliers 212, 214, . . . , 216. An addition/average calculation unit 220 adds and averages outputs of the multipliers 212, 214, . . . , 216, thereby acquiring a result. A calculator 230 performs an arc tangent operation for the result from the addition/average calculation unit 220 and generates a phase offset value. Accordingly, a multiplier 240 acquires a frequency offset value $D_f$ by multiplying the phase offset value by $-1/(2\pi N)$.

For example, in an OFDMA system according to IEEE 802.16d/e standard specifications, a transmitted/received signal, as shown in FIG. 3, has 3 repetitive periodic characteristics in the time domain according to preamble symbol of the first symbol location of the downlink (DL) after the CP (Cyclic Prefix) interval. In FIG. 4, the 1024 subcarriers of the preamble symbol in IEEE 802.16d/e specification have a configuration that 852 subcarriers, excluding guard intervals (GI) including 86 subcarriers, are separated into 3 segments and transmitted/received. Here, the 1024 subcarriers have repetitive periodic characteristics every 341.3 subcarriers. Accordingly, since the 1024 subcarriers are transmitted in one non-zero subcarrier with two zero subcarriers, when the 1024 subcarriers are sampled, the sampled subcarriers experience periodically phase offset with each other according to the segment numbers.

Accordingly, in the frequency offset estimator 200 according to the conventional art which calculates a frequency offset according to an averaging mechanism and a phase compensation method, as shown in FIG. 2, since the number of samples used in the averaging mechanism is not taken into consideration, the estimated frequency offset is not accurate. Also, the frequency offset estimator 200 requires many hardware and software resources such as the complex conjugate number operators 211, 213, . . . , 215, the multipliers 212, 214, . . . , 216, the addition/average calculation unit 220, etc., thereby lowering link performance. Accordingly, an apparatus which estimates an accurate frequency offset for each of the segment numbers and synchronizes the mobile device system with less resources shall be necessary.

SUMMARY OF THE INVENTION

The present invention has been made to solve the aforementioned problems occurring in the conventional art, and it is an objective of the present invention to provide an initial synchronizer for a receiver of an OFDMA wireless communication system having an apparatus for estimating and compensating an initial carrier frequency offset which may be compatible with an initial frame boundary detection process based on simplified implementation solutions for estimating accurately a frequency offset and an efficient scalable sharing architecture.

Another objective of the present invention is to provide a method for estimating and compensating an initial carrier frequency offset which supplies a basis of the cell searching by efficiently processing a preamble of a down link showing characteristics of a phase offset with each other according to the segment numbers for the OFDM subcarriers and characteristics of a non-integer repetitive sample pattern for the OFDM subcarriers with an averaging scheme.

To accomplish the above objectives, according to one aspect of the present invention, there is provided an apparatus for estimating and compensating a carrier frequency offset in an orthogonal frequency-division multiplexing (OFDM) system including: a first means correlating a received signal and a delayed signal of a predetermined period of the received signal within a correlation window, and a second means converting the correlated value into a phase value, compensating a phase of the converted result according to preamble segment numbers, and estimating an initial carrier frequency offset value, wherein the correlation window is set based on a Cycle Prefix (CP) and a preamble repetition length from a position determined according to an initial frame boundary of the received signal.

According to other aspect of the present invention, there is also provided an initial synchronizer for a receiver of a wireless communication system including: a frame boundary detector accumulating a multiplication value of a present sample value of a received signal and a complex conjugate value of a previous sample of the received signal in which a preamble repetition is reflected, and calculating a position of a maximum value of correlation values based on the accumulated values as an initial frame boundary index, and a carrier frequency offset estimator estimating phase offset values for 3 segment numbers based on an arc-tangent value of a maximum correlation value at the initial frame boundary index, normalizing the estimated phase offset values, and generating an initial carrier frequency offset value for each of the segment numbers.

According to other aspect of the present invention, there is also provided a receiver of a wireless communication system including: a receiver circuit receiving QFDM based radio frequency (RF) signal and converting the received signal into a baseband signal, and a synchronizer calculating an initial frame boundary index indicating a final position of a preamble based on sample values of the baseband signal, estimating phase offset values for 3 segment numbers based on a phase offset value at the initial frame boundary index, calculating initial, carrier frequency offset values for each of the segment numbers from the estimated phase offset values, and generating a synchronization signal, wherein the baseband signal is synchronized according to the synchronization signal and the synchronized baseband signal is demodulated to acquire a signal corresponding to a transmitted signal.

According to other aspect of the present invention, there is also provided a method of estimating and compensating a carrier frequency offset in an orthogonal frequency-division multiplexing (OFDM) system, the method comprising the steps of: correlating a received signal and a signal delayed by a predetermined period from the received signal within a correlation window, the correlation window is set based on a Cycle Prefix (CP) and a preamble repetition length from a position determined according to an initial frame boundary of the received signal, and converting the correlated result into a phase value, compensating a phase of the converted result according to preamble segment numbers, and estimating an initial carrier frequency offset value.

According to other aspect of the present invention, there is also provided a method of data receiving for a wireless communication system, the method comprising the steps of: receiving an OFDM based radio frequency (RF) signal and converting the received signal into a baseband signal, generating an initial frame boundary index indicating a final position of a preamble based on the baseband signal, estimating phase offset values for 3 segment numbers based on a phase offset at the initial frame boundary index, calculating initial carrier frequency offset values for each of the segment numbers from the estimated phase offset values, and generating a synchronization signal, synchronizing the baseband signal according to the synchronization signal and demodulating the synchronized baseband signal to acquire a signal corresponding to a transmitted signal.

DETAILED DESCRIPTION OF EMBODIMENTS

Figure 1:
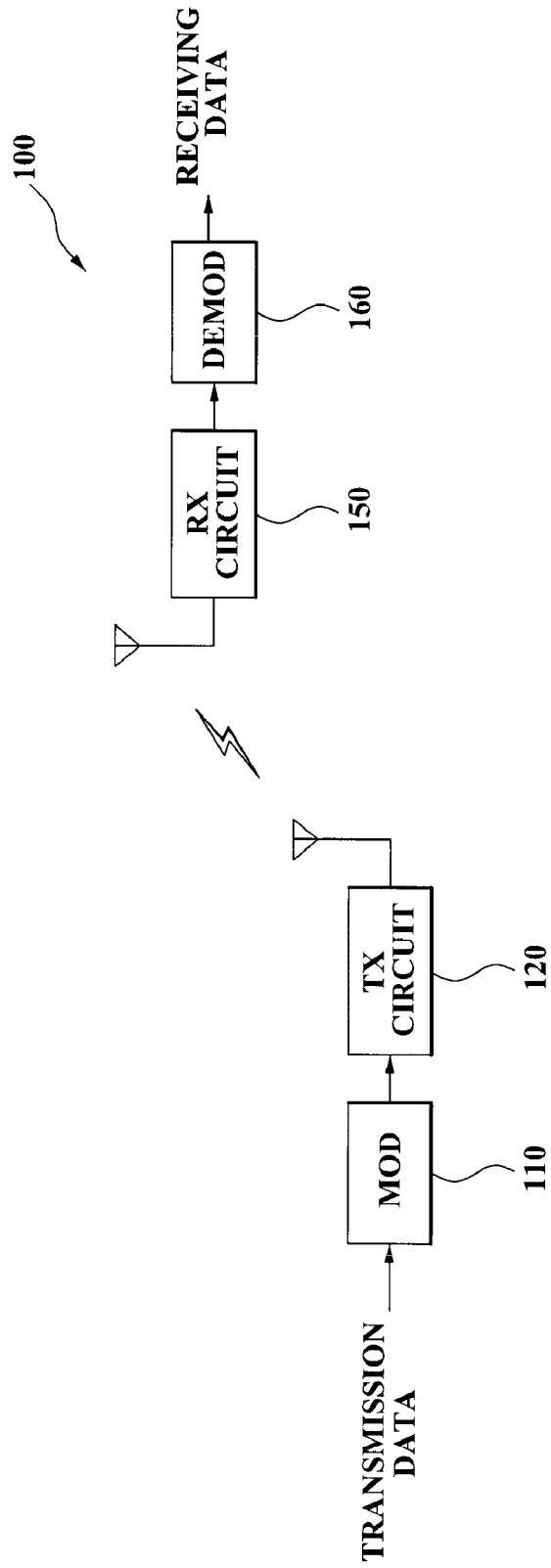
FIG. 1 is a block diagram illustrating a conventional wireless communication system.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
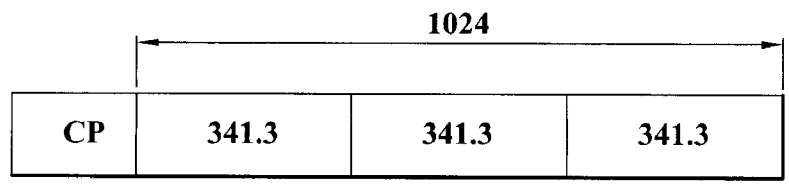
FIG. 3 is a drawing illustrating a preamble symbol in the time domain.

As described above, in an OFDMA system according to IEEE 802.16d/e standard specification, a transmitted/received signal, as shown in FIG. 3, has 3 repetitive periodic characteristics in a time domain according to preamble symbol of the first symbol location of the downlink (DL) after a CP (Cyclic Prefix) duration. The repetitive pattern characteristics of training symbols of an OFDM preamble may be utilized for an estimation of an initial carrier frequency offset. That is, if there is a same frequency offset in repeated samples in the time domain, a corresponding offset can be estimated.

Figure 4:
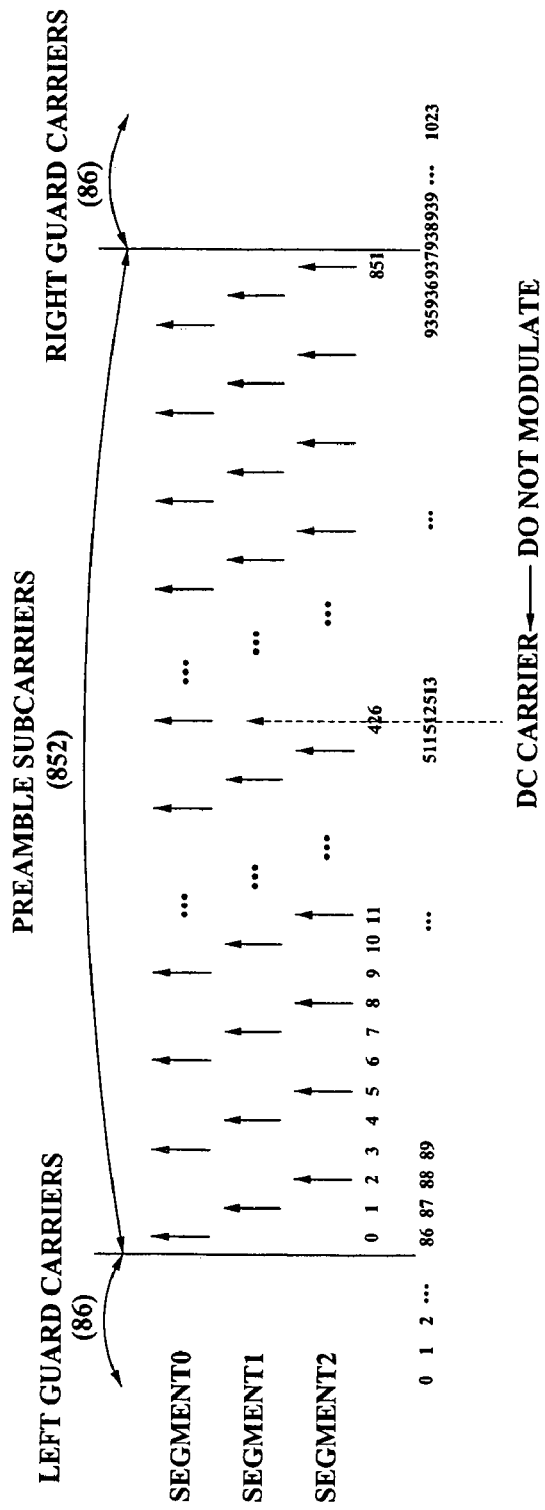
FIG. 4 is a drawing illustrating a preamble carrier set.

In FIG. 4, 1024 subcarriers have repetitive periodic characteristics every 341.3 subcarriers. Here, since the 1024 subcarriers are transmitted in one non-zero subcarrier with two zero subcarriers, when the 1024 subcarriers are sampled in sequence, the sampled repetition samples experience a phase offset with each other according to the segment numbers. In sample characteristics like the phase offset for each of the segment numbers, a mobile device system can be synchronized by estimating and accurately compensating an initial carrier frequency offset and accurately estimating a cell ID and a cell number in a cell searching process.

For example, a sample signal $r(n)$ of timing index n and a sample signal $r(n+N)$ of timing index $(n+N)$ with respect to the received signal $r(t)$ are shown as Equation 1. In Equation 1, $D_f$ is a frequency offset and $x()$ is a signal amplitude.

$$r(n) = x(n)e^{j2\pi D_f n}$$

$$r(n+N) = x(n+N)e^{j2\pi D_f (n+N)} \quad \text{Equation 1}$$

Here, the phase offset value $2\pi D_f n$ is acquired by using a complex conjugate for the Nth repeated sample $r(n+N)$ like Equation 2. That is, the frequency offset value $D_f$ is derived like Equation 3 based on the $-\tan(2\pi D_f n)$ which is derived from the relation between a real value Re{ } and an imaginary value Im{ } in Equation 2.

$$a = Re\{r(n)r^*(n+N)\} = [-\cos(2\pi D_f N)]|x(n)|^2$$
$$b = Im\{r(n)r^*(n+N)\} = [-\sin(2\pi D_f N)]|x(n)|^2 \quad \text{Equation 2}$$

$$D_f = (-1/2\pi N)\tan^{-1}[-\tan(2\pi D_f N)] \quad \text{Equation 3}$$

Here, the preamble subcarriers have a phase offset with each other according to the segment number in the time domain, and have characteristics of a non-integer repetitious sample pattern as shown in FIG. 3. In the present invention, the initial frame boundary index 1 is estimated by using an integer 811 correlation window length in an averaging technique for the non-integer repetitious sample pattern of the downlink preamble in a mobile device from a base station. Namely, with the assumption that the samples of the received signal r(t) is repeated every 341 samples, like Equation 4 below, the complex conjugate for a delayed sample r(1+n) with a present sample r(1+n+341) is used. In this instance, the initial frame boundary index 1 and the phase offsets estimated according to a correlation value in an argument of an accumulation of 811 multiplications of r*(1+n) and r(1+n+341). Accordingly, when the estimated phase offset is normalized by α, a carrier frequency offset $\theta_0$ can be acquired. The carrier frequency offset $\theta_0$ corresponds to a case in which the segment number is 0. Here, the integer 811 correlation window length is a length of 128 samples of the CP interval, the first 341 samples and next 342 samples of the OFDM preamble is summed, thereby avoiding a non-integer repetitious characteristics of a sample pattern and using an averaging mechanism appropriately.

The carrier frequency offset $\theta_0$ can be compensated like Equation 5, shown below, to acquire the other respective initial carrier frequency offsets $\theta_1$, $\theta_2$ corresponding to the segment numbers 1 and 2.

$$\theta_0 = \alpha \left[ \arg \sum_{n=0}^{810} r*(l+n)r(l+n+341) \right] \quad \text{Equation 4}$$

$$\theta_1 = \alpha \left[ -2\pi/3 + \arg \sum_{n=0}^{810} r*(l+n)r(l+n+341) \right] \quad \text{Equation 5}$$

$$\theta_2 = \alpha \left[ +2\pi/3 + \arg \sum_{n=0}^{810} r*(l+n)r(l+n+341) \right]$$

Figure 5:
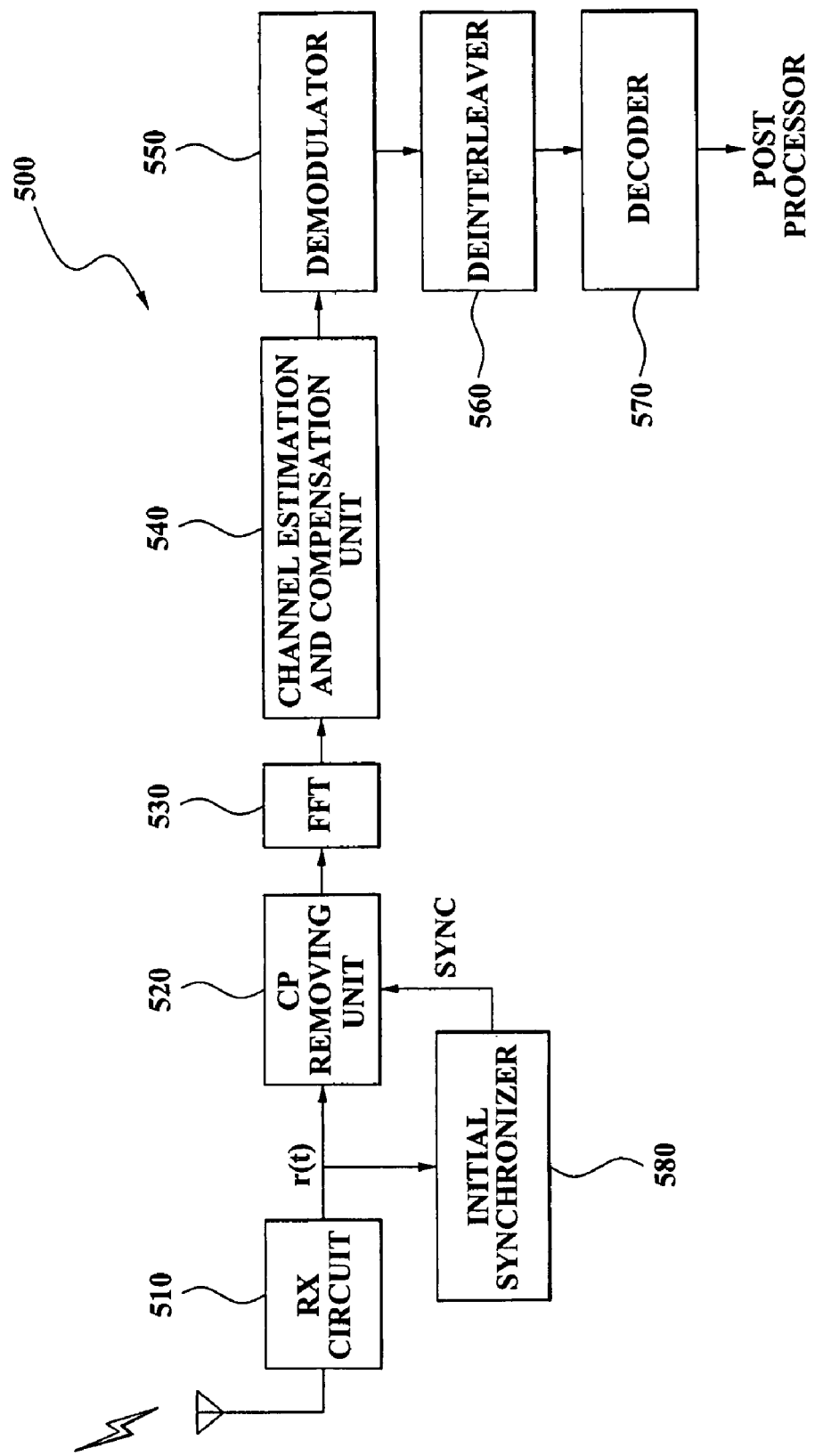
FIG. 5 is a block diagram illustrating a receiver according to an embodiment of the present invention.

A receiver 500, according to an embodiment of the present invention, which may synchronize a system based on a carrier frequency offset estimation is shown in FIG. 5. Referring to FIG. 5, the receiver 500 includes an Rx circuit 510, a Cyclic Prefix (CP) removing unit 520, a Fast Fourier Transform (FFT) unit 530, a channel estimation and compensation unit 540, a demodulator 550, a deinterleaver 560, a decoder 570, and an initial synchronization unit 580.

An OFDM based radio frequency (RF) signal which may be influenced by additive white Gaussian noise (AWGN) is received via an antenna from a channel, and the received RF signal is frequency-down converted and transformed to baseband signal r(t) in the Rx circuit 510. The initial synchronization unit 580 processes a baseband signal r(t) output from the Rx circuit 510 with the preamble signal to generate a synchronization signal SYNC to synchronize the system. The synchronization signal SYNC is activated at a timing position indicating the beginning of the downlink to the mobile device from a base station, and the CP removing unit 520 may remove the Cyclic Prefix (CP) attached before the preamble signal based on the synchronization signal SYNC.

Accordingly, the received baseband signal r(t) may be synchronized with the synchronization signal SYNC, in this case an original signal transmitted from a transmitter may be acquired from the received baseband signal r(t) by post processors, i.e., the FFT unit 530, the channel estimation and compensation unit 540, the demodulator 550, the deinterleaver 560, and the decoder 570, and an initial synchronization unit 580. Besides this process, a cell searcher included in the initial synchronization unit 580 may determine a cell identification (ID) and substantial numbers of the segments.

Since it is already well known in the arts, detailed explanations are omitted for the post processors, the FFT unit 530 performing FFT operation for received symbols, the channel estimation and compensation unit 540 compensating a phase offset and estimating a fine channel, and the demodulator 550 demodulating the received symbols according to a demodulation scheme, for example, QAM, QPSK, etc.

The receiver 500 may be adopted for use in an OFDMA based wireless communication system in accordance with an IEEE 802.16d/e standard specification. Also, besides this system, the receiver 500 may be adopted to other systems in accordance with a WiBro or WiMAX standard specification, $4^{th}$ generation mobile communication, etc.

In particular, the initial synchronization unit 580 may be adopted for use in a mobile Internet system of a time division duplex (TDD) scheme transmitting/receiving asynchronous data between a downlink to a mobile device from a base station and an uplink to the base station from the mobile device thereby improving transmission speed so as to secure reliability high speed and enable large scale data to be transmitted and received by the initial synchronization, according to an embodiment of the present invention, resulting in enhancing service quality.

Figure 2:
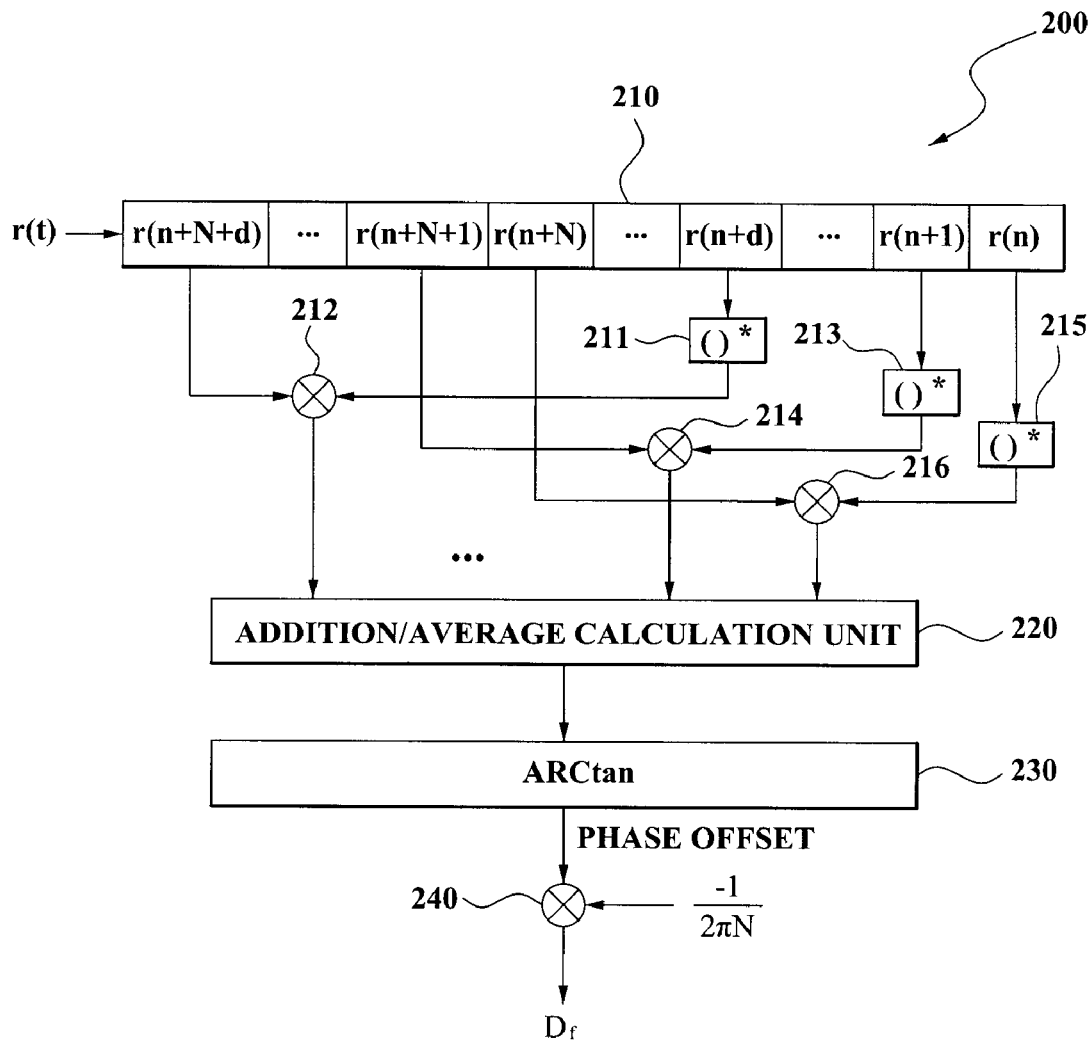
FIG. 2 is a block diagram illustrating a conventional carrier frequency offset estimator.

The frequency offset estimator 200 according to the conventional art similar to FIG. 2 has deteriorating link performance due to a high demand on hardware and software resources. The initial synchronization unit 580, however, simplifies implementation, estimates the initial carrier frequency offset compatible with a process of an initial frame boundary detection, etc., based on a scalable sharing architecture which may be shared from low speed system to high speed system, and synchronizes a system.

Namely, the initial synchronization unit 580 calculates an initial frame boundary index indicating a final position of a preamble based on sample values of the received signal r(t) converted into a baseband signal, and estimates phase offset values for 3 segment numbers based on a phase offset value PHO at the initial frame boundary index. Also, the initial synchronization unit 580 calculates initial carrier frequency offset values ($\theta_0$, $\theta_1$, $\theta_2$) for each of the segment numbers from the estimated phase offset values, and generates a synchronization signal SYNC.

Figure 6:
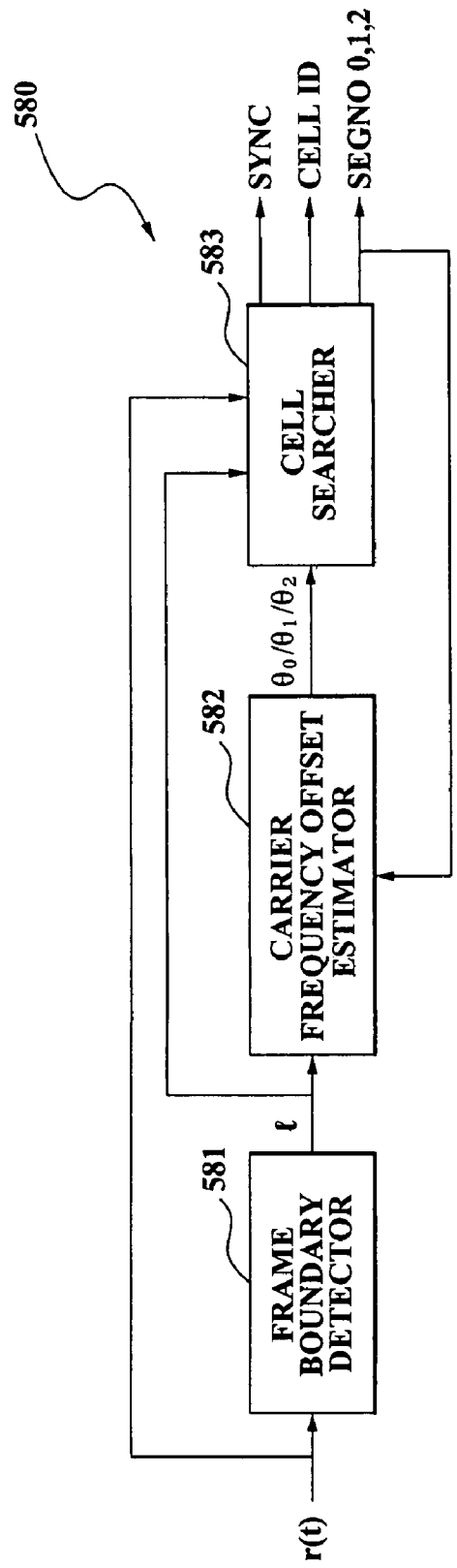
FIG. 6 is a detailed block diagram illustrating the initial synchronization unit shown in FIG. 5.

FIG. 6 is a detailed block diagram illustrating the synchronization unit 580 shown in FIG. 5. Referring to FIG. 6, the synchronization unit 580 includes a frame boundary detector 581, a carrier frequency offset estimator 582, and a cell searcher 583.

The frame boundary detector 581 accumulates a multiplication value of a present sample value of a received signal r(t), for example, r(342), and a complex conjugate value of a previous sample of the received signal, for example, r(1), which is delayed during a preamble repetition, for example, as much as 341 samples, and calculating a position of a maximum value of correlation values based on the accumulated multiplication values as an initial frame boundary index 1. The carrier frequency offset estimator 582 utilizes a correlation value based on an absolute value of an accumulated value of 811 most recent multiplication values or a square of the absolute value.

Namely, when the preamble of the received signal r(t) is finished, the correlation value based on the absolute value of the accumulated value of 811 most recent multiplication values or the square of the absolute value is maximized, and the initial frame boundary index 1 indicating this time is acquired. The frame boundary detector 581 is detailed below in an explanation of FIG. 7.

Meanwhile, the carrier frequency offset estimator 582 estimates phase offset values for 3 OFDM based segment numbers based on an arc-tangent value PHO of a corresponding maximum correlation value at the initial frame boundary index acquired by the frame boundary detector 581, normalizes the estimated phase offset values to other values, and generates initial carrier frequency offset values ($\theta_0, \theta_1, \theta_2$) for each of the segment numbers. Namely, the carrier frequency offset estimator 582 may generate a value that the arc-tangent value PHO of the maximum correlation value, for example, C(1), is normalized as an initial carrier frequency offset value for a first segment, for example, segment 0. The carrier frequency offset estimator 582 may generate a value that a $2\pi/3$ higher phase than the arc-tangent value PHO of the maximum correlation value C(1) is normalized as an initial carrier frequency offset value for a second segment, for example, segment 1. The carrier frequency offset estimator 582 may generate a value that a $2\pi/3$ lower phase than the arc-tangent value PHO of the maximum correlation value C(1) is normalized as an initial carrier frequency offset value for a third segment, for example, segment 2. Here, a substantial and accurate number of segments corresponding to the initial carrier frequency offset values ($\theta_0, \theta_1, \theta_2$) may be identified in the cell searcher 583.

The cell searcher 583 generates a synchronization signal SYNC based on the initial carrier frequency offset values ($\theta_0, \theta_1, \theta_2$) acquired according to the normalization of the carrier frequency offset estimator 582. Namely, the initial frame boundary index 1 indicates a timing index that the initial carrier frequency offset values ($\theta_0, \theta_1, \theta_2$) are acquired, and indicates the time when the preamble of the received signal r(t) is finished.

Also, the received signal r(t) may be synchronized according to the initial carrier frequency offset values ($\theta_0, \theta_1, \theta_2$) and the initial frame boundary index 1, the cell searcher 583 can search a cell identification and an accurate number of the segments from the received signal r(t). The respective initial carrier frequency offset values ($\theta_0, \theta_1, \theta_2$) acquired from the carrier frequency offset estimator 582 are values corresponding to the segment numbers. In this case, the cell searcher 583 processes the preamble of the received signal r(t) according to a predetermined algorithm referring to the initial carrier frequency offset values ($\theta_0, \theta_1, \theta_2$), compares the processed results with predetermined preamble values, and determines a substantial and accurate number of segments, SEGNO 0, 1, 2. Also, the cell searcher 583 analyzes the received signal r(t) referring to the initial carrier frequency offset values ($\theta_0, \theta_1, \theta_2$) and identifies a cell ID, for example, a base station, a sector, etc. If a corresponding base station is connected with the mobile device by the operations of the cell searcher 583 in this way, the post processors 520 to 570 demodulate data following the preamble and output the demodulated data. The outputs of the decoder 570 may be processed in other processors. The data processed by the other processors may be output to a user playing an audio or video, or stored in a memory in a compressed format, for example MPEG.

Figure 7:
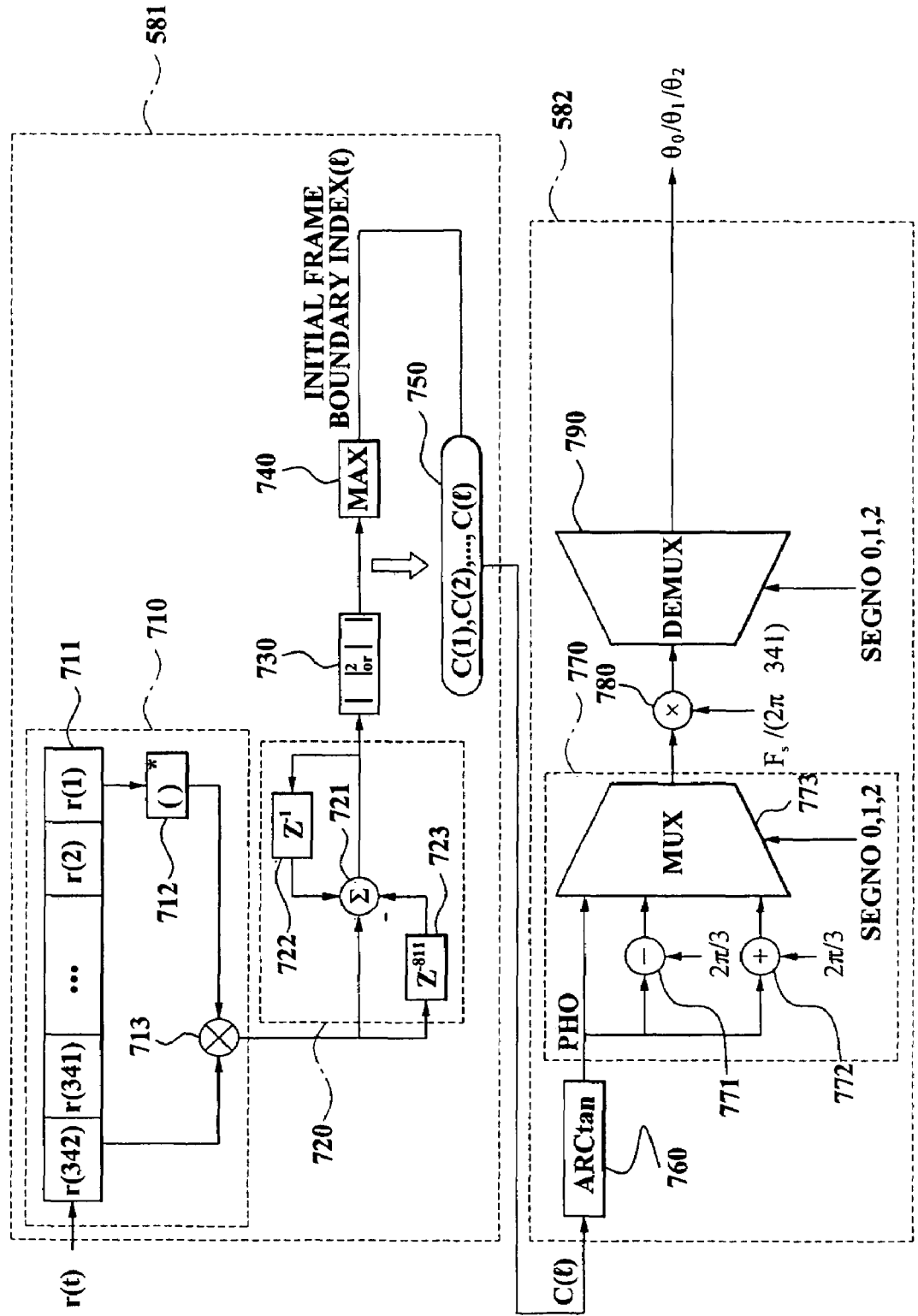
FIG. 7 is a detailed block diagram illustrating the frame boundary detector and the carrier frequency offset estimator shown in FIG. 6.

FIG. 7 is a detailed block diagram illustrating the frame boundary detector 581 and the carrier frequency offset estimator 582 shown in FIG. 6. Referring to FIG. 7, the frame boundary detector 581 includes a filter 710, an accumulator 720, a correlation outputting unit 730, and a maximum value calculation unit 740. Also, the carrier frequency offset estimator 582 includes an arc-tan calculator 760, a phase offset estimator 770, a multiplier 780, and a demultiplexer 790. A flowchart shown in FIG. 8 is referred to explain detailed operations of the frame boundary detector 581 and the carrier frequency offset estimator 582.

Figure 8:
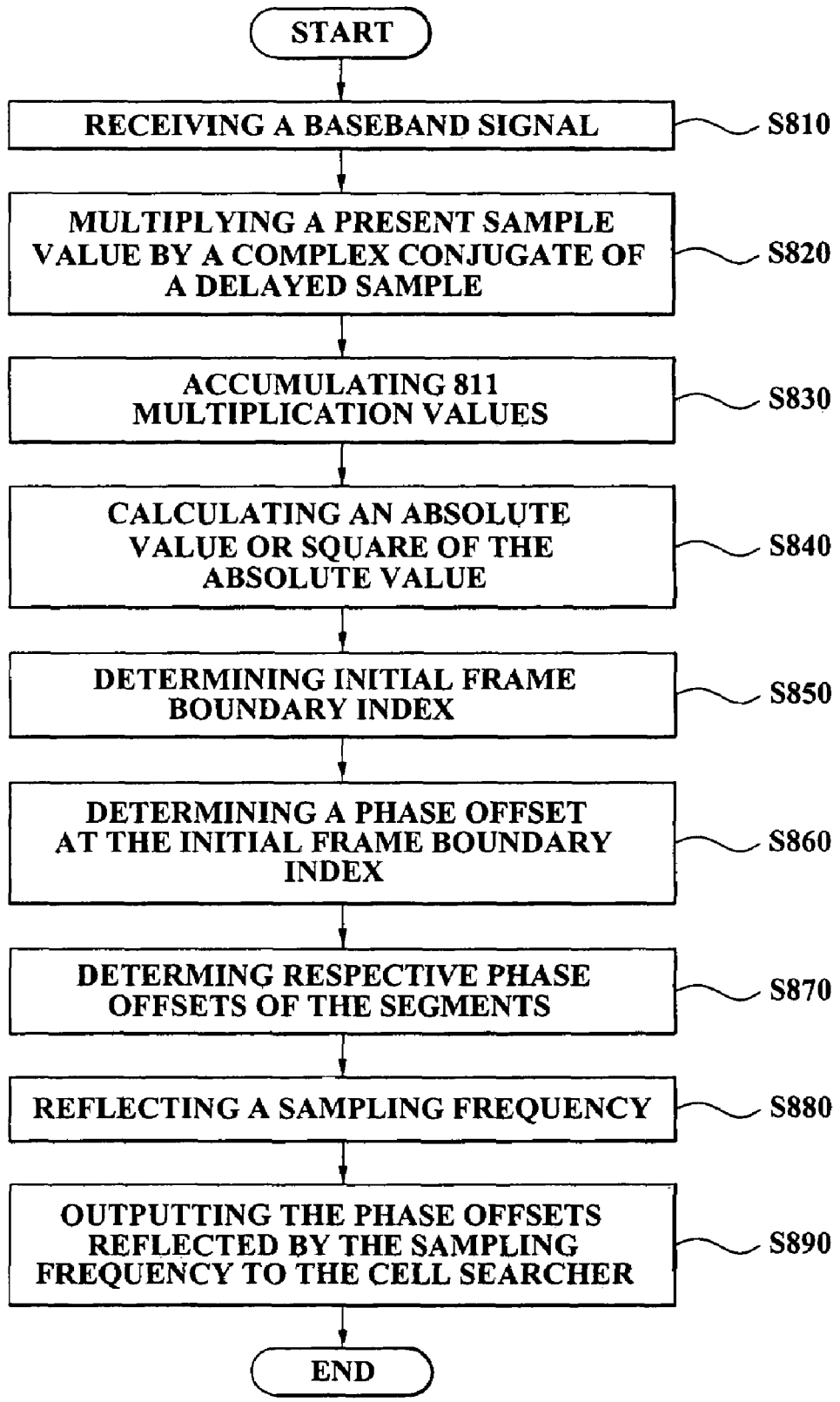
FIG. 8 is a flowchart illustrating the operations of the frame boundary detector and the carrier frequency offset estimator shown in FIG. 6.

At first, in step S810 of FIG. 8, the filter 710 receives a baseband signal r(t) or sample values of the received signal r(t). Next, in step S820 of FIG. 8, the filter 710 calculates a multiplication value of the present sample value of the received signal r(t), for example, r(342), and a complex conjugate value of the previous sample of the received signal r(t), for example, r(1), in which the preamble repetition, for example, a duration of 341 samples, is reflected.

For this operation, the filter 710 includes a shift register 711, a conjugator 712, and a multiplier 713. The shift register 711 stores and delays sample values of the received signal r(t). The shift register 711 may store 342 samples by using buffers which can record data of a corresponding size. The conjugator 712 calculates the complex conjugate values, for example, r*(1), r*(2), r*(3), . . . , for samples r(1), r(2), r(3), . . . , which are delayed and output from the shift register 711. The multiplier 713 multiplies the present sample value of the received signal r(t), for example, r(342), by a complex conjugate value output from the conjugator 712, for example, r*(1).

Next, in step S830 of FIG. 8, the accumulator 720 accumulates in sequence the multiplied values output from the multiplier 713. The accumulator 720 includes an accumulation value calculation unit 721, a first register 722 and a second register 723.

In step S830 of FIG. 8, the accumulation value calculation unit 721 adds a present multiplication value output from the filter 710 and a value accumulated during a previous period, and subtracts a multiplication value before 811 samples output from the filter 710, from the added result. In this case, the first register 722 delays an output of the accumulation value calculation unit 721 by one sample and feedbacks the value accumulated at previous sampling time to the accumulation value calculation unit 721 to supply the value accumulated during the previous period. The second register delays the multiplied value output from the filter 710 by 811 samples and supplies the multiplication value before 811 samples to the accumulation value calculation unit 721 to allow the accumulation value calculation unit 721 to subtract the multiplied value before 811 samples output from the filter 710. Here, the first register 722 and the second register 723 may be shift registers that operate according to predetermined clock signals.

Next, in step S840 of FIG. 8, the correlation outputting unit 730 calculates an absolute value of the recent accumulated value as much as 811 samples, or a square of the absolute value and outputs the calculated value to the maximum value calculation unit 740 as the correlation value. In step S850 of FIG. 8, the maximum value calculation unit 740 may generate a timing position in which the correlation value is maximized as the initial frame boundary index 1. The position in which the correlation value is maximized corresponds to the time when the preamble of the received signal r(t) is finished.

Meanwhile, in step S860 of FIG. 8, the arc-tan calculator 760 included in the carrier frequency offset estimator 582 calculates an arc-tangent value PHO of the maximum correlation value at the initial frame boundary index 1. A buffer 750 may be utilized to output the maximum correlation value C(1) at the initial frame boundary index 1 as shown in FIG. 7. Or, when the maximum correlation value C(1) at the initial frame boundary index 1 is output to the maximum value calculation unit 740, the maximum correlation value C(1) may be input directly to the arc-tan calculator 760 from the correlation outputting unit 730.

The phase offset estimator 770 estimates the phase offset values for the 3 segment numbers from the calculated arc-tangent value PHO. For this operation, the phase offset estimator 770 includes a subtractor 771, an adder 772, and a multiplexer 773. The subtractor 771 subtracts $2\pi/3$ from the arc-tangent value PHO. The adder 772 adds $2\pi/3$ and the arc-tangent value PHO. In this case, the multiplexer 773 selects one of the arc-tangent value PHO, the subtractor 771 output, and the adder 772 output, and outputs a phase offset value corresponding to a segment number, in step S870 of FIG. 8. Here, the multiplexer 773 selects a corresponding phase offset according to control signals SEGNO 0, 1, 2 input from the cell searcher 583.

Meanwhile, the multiplier 780 included in the carrier frequency offset estimator 582 multiplies each of the estimated phase offset values from the phase offset estimator 770 by a predetermined value, similar to Equation 6, to normalize, in step S880 of FIG. 8. In Equation 6, Fs is a sampling frequency.

$$\text{Normalization Value} = F_s/(2\pi * 341) \qquad \text{Equation 6}$$

In step S890 of FIG. 8, the demultiplexer 790 outputs the respective outputs from the multiplier 780 to the cell searcher 583 according to the control signals SEGNO 0, 1, 2 from the cell searcher 583.

As described above, the carrier frequency offset estimator 582 estimates 3 phase offset values based on an arc-tangent value PHO of a maximum correlation value C(1), normalizes the estimated 3 phase offset values, and generates the initial carrier frequency offset value $(\theta_0, \theta_1, \theta_2)$ for each of the segment numbers.

The frame boundary detector 581 corresponds to a means for correlating a received signal r(t) and a signal delayed by a predetermined period of the received signal r(t) within a correlation window. The correlation window is set based on a Cycle Prefix (CP) and a preamble repetition length from a position determined according to the initial frame boundary 1 of the received signal r(t). For example, an OFDM based preamble sequence repetition length is not integer. Accordingly, in the present invention, the correlation window is set to 811 sample length in which 128 samples of the CP interval, the first 341 samples, and the next 342 samples of the OFDM preamble is summed, so as to be averaged.

Also, the carrier frequency offset estimator 582 corresponds to a means for converting the correlated value from the frame boundary detector 581 into a phase value, compensating a phase of the converted result according to the preamble segment numbers, and estimating the initial carrier frequency offset value $(\theta_0, \theta_1, \theta_2)$. Here, the phase of the converted result is compensated as much as $2\pi/3$ for a segment number 1 SEGNO 1 and the phase of the converted result is compensated as much as $-2\pi/3$ for a segment number 2 SEGNO 2.

Figure 9:
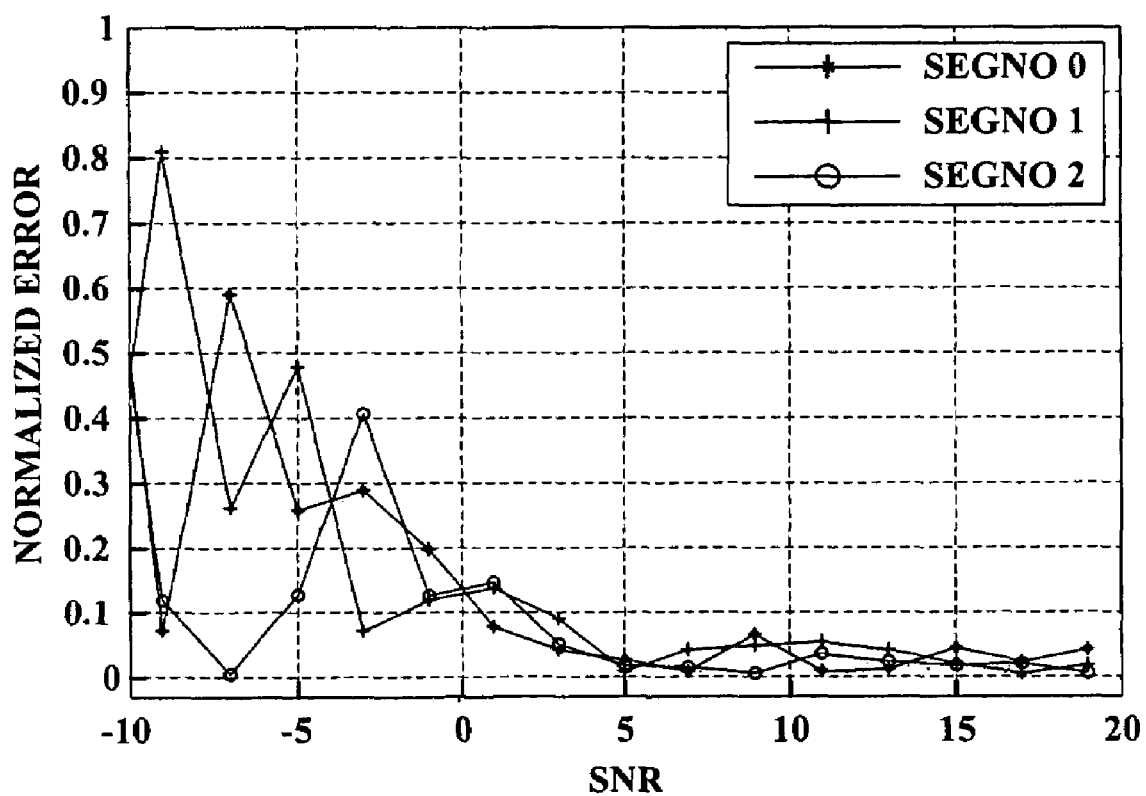
FIG. 9 is a graph illustrating carrier frequency offset errors versus SNR to explain a performance of the receiver according to an embodiment of the present invention.

FIG. 9 is a graph illustrating carrier frequency offset errors versus Signal-to-Noise Ratio (SNR) to explain a performance of the receiver according to an embodiment of the present invention. Referring to FIG. 9, a simulation result according to the above described process is shown. Here, it is assumed that a signal is received from 3-tap multi-fading channel and an initial frequency offset of the signal is 1 KHz. In the simulation result, it is shown that the carrier frequency offset errors are decreased from SNR −10 to +20 dB in the respective segment numbers SEGNO 0, 1, 2. In particular, the carrier frequency offset errors in which SNR is greater than 3 dB is very small, accordingly a data/signal receiving performance and service qualities are expected to be improved.

As described above, in the initial synchronizer 580 of the receiver 500 for the OFDMA wireless communication system according to an embodiment of the present invention, the frame boundary detector 581 detects a position of a maximum value of correlation values based on 811 accumulated values which are acquired by using complex conjugates of delayed samples of a received signal r(t), as an initial frame boundary index 1. The carrier frequency offset estimator 582 estimates an arc-tangent value PHO of the maximum correlation value C(1) at the initial frame boundary index 1 as a phase offset value for the first segment number SEGNO 0, estimates phase offset values for the second and third segment numbers SEGNO 1, 2 which have a $\pm 2\pi/3$ phase difference from the arc-tangent value PHO, normalizes the estimated 3 phase offset values, and outputs the initial carrier frequency offset values for each of the segment numbers.

As apparent from the foregoing, in the apparatus for estimating and compensating carrier frequency offset and data receiving method in the receiver of the wireless communication system, since the preamble within the down link interval is processed efficiently in the time domain independent of segment numbers and the initial carrier frequency offsets is estimated accurately, it is possible to enhance the data receiving performance and service qualities with easy cell searching in systems such as IEEE 802.16d/e, WiBro, WiMAX, etc. Also, since the initial synchronizer according to the present invention is based on a scalable sharing architecture, it is can be easily implemented using little hardware and software resources.

The function used in the apparatus for estimating and compensating the initial carrier frequency offset in the receiver of the wireless communication system and the data receiving method disclosed herein can be implemented by storing a code readable by a computer in a computer-readable recording medium. The computer-readable recording medium includes all kinds of recording devices which stores therein data readable by a computer system. Examples of the computer-readable recording medium include ROMs, RAMs, CD-ROMs, magnetic tapes, floppy disks, optical data storage units, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of estimating and compensating a carrier frequency offset in an orthogonal frequency-division multiplexing (OFDM) system, the method comprising the steps of:

correlating a received signal with a signal delayed by a predetermined period from the received signal in a correlation window, wherein the correlation window is set based on a Cycle Prefix (CP) and a preamble repetition length from a predetermined position;

converting the correlated result into a phase value;

compensating the phase value by a predetermined phase compensation value that is set differently according to preamble segment numbers; and estimating an initial carrier frequency offset value based on the compensated phase value.

2. The method of claim 1, wherein the predetermined position is a position determined according to an initial frame boundary of the received signal.

3. The method of claim 2, wherein the correlated result is maximized at a position indicating the initial frame boundary.

4. The method of claim 1, wherein the predetermined period is 341 sample period.

5. The method of claim 1, wherein the correlation window is 811 sample period.

6. The method of claim 1, wherein the phase value is compensated as much as $2\pi/3$ for a segment number 1 and the phase value is compensated as much as $-2\pi/3$ for a segment number 2.

7. The method of claim 1, further comprising:
compensating frequency offset of the received signal using the estimated initial carrier frequency offset value.

8. The method of claim 1, wherein the received signal and a complex conjugate of the delayed signal are correlated.

9. The method of claim 1, wherein the estimating an initial carrier frequency offset value comprises the step of:
normalizing the compensated phase value according to a normalization value after the step of compensating the phase value.

10. An apparatus for estimating and compensating a carrier frequency offset in an OFDM system, the apparatus comprising:
a first means for correlating a received signal with a delayed signal of a predetermined period of the received signal in a correlation window; and
a second means for converting the correlated value into a phase value, compensating the phase value by a predetermined phase compensation value that is set differently according to preamble segment numbers, and estimating an initial carrier frequency offset value based on the compensated phase value,
wherein the correlation window is set based on a Cycle Prefix (CP) and a preamble repetition length from a predetermined position.

11. The apparatus of claim 10, wherein the predetermined position is a position determined according to an initial frame boundary of the received signal.

12. The apparatus of claim 10, wherein the phase value is compensated as much as $2\pi/3$ for a segment number 1 and the phase value is compensated as much as $-2\pi/3$ for a segment number 2.

* * * * *